United States Patent
Trzmiel et al.

[11] Patent Number: 5,597,367
[45] Date of Patent: Jan. 28, 1997

[54] APPARATUS FOR TENSIONING OF A CAM SHAFT DRIVE

[75] Inventors: Alfred Trzmiel, Grafenberg; Wolfgang Stephan, Zizishausen; Peter Schmied, Oberboihingen, all of Germany

[73] Assignee: Hydraulik-Ring Antriebs- und Steuerungstechnik GmbH, Nürtingen, Germany

[21] Appl. No.: 313,353

[22] Filed: Sep. 27, 1994

[30] Foreign Application Priority Data

Nov. 5, 1993 [DE] Germany ............... 43 37 827.7

[51] Int. Cl.⁶ .............................................. F16H 7/08
[52] U.S. Cl. .............................. 474/110; 474/111
[58] Field of Search ................ 254/228; 474/111, 474/110, 109

[56] References Cited

U.S. PATENT DOCUMENTS

| | | | |
|---|---|---|---|
| 2,963,918 | 12/1960 | Blakstad | 474/111 |
| 3,964,331 | 6/1976 | Oldfield | 474/110 |
| 5,109,813 | 5/1992 | Trzmiel et al. | 474/110 |
| 5,117,786 | 6/1992 | Trzmiel et al. | 474/110 |
| 5,120,278 | 6/1992 | Trzmiel et al. | 474/110 |
| 5,197,420 | 3/1993 | Arnold et al. | 474/110 |
| 5,246,404 | 9/1993 | Ojima | 474/111 |
| 5,323,739 | 6/1994 | Mollers | 474/110 |
| 5,352,159 | 10/1994 | Suzuki et al. | 474/110 |

*Primary Examiner*—Katherine Matecki
*Attorney, Agent, or Firm*—Robert W. Becker & Associates

[57] ABSTRACT

An apparatus having two pistons journalled elastically yieldable counter to tensioning direction. As a consequence of double-acting construction, impacts or shocks of an endless drive and with that wear of a primary-side drive element, that is that of a tooth belt or chain connecting the crank shaft with the cam shaft can be avoided. If during operation of the apparatus moreover shocks or impacts arise and occur in the endless drive, then the pistons can yield elastically so that tensioning shoes fastened on the pistons are not subject to any increased wear. As a consequence of resilient damping of the shocks or impacts, the entire apparatus is also less strongly burdened and loaded so that a long life expectancy is assured. As a consequence of the elastically yieldable journalling, the pistons are always again loaded into the tensioning positioning thereof so that the tensioning of the endless drive is not influenced thereby.

15 Claims, 3 Drawing Sheets

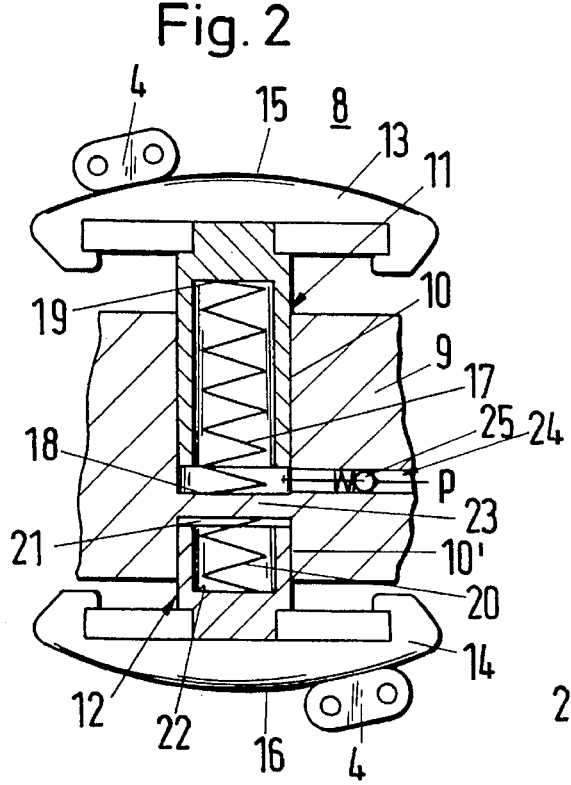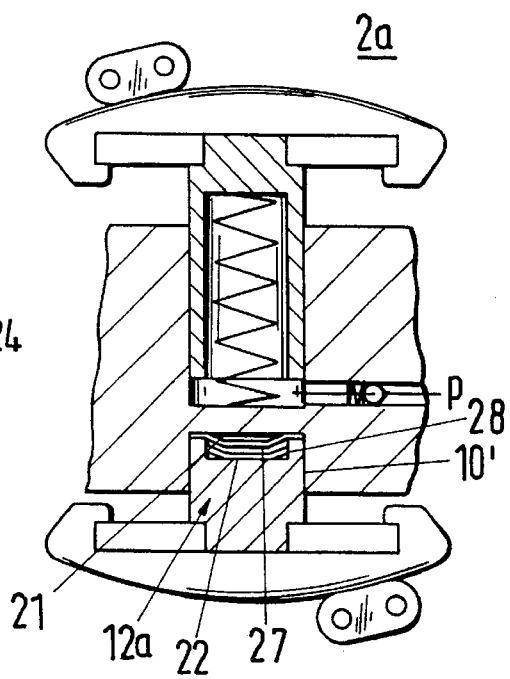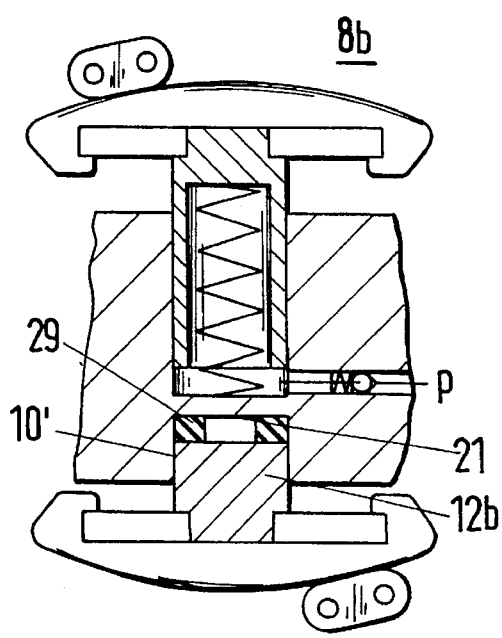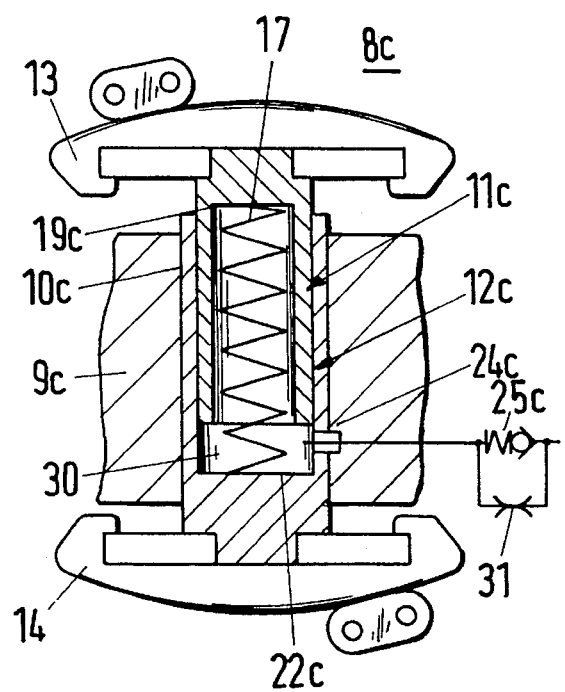

5,597,367

APPARATUS FOR TENSIONING OF A CAM SHAFT DRIVE

BACKGROUND OF THE INVENTION

1. Field of the Invention

The present invention concerns an apparatus for tightening, setting, tensioning or clamping of a cam shaft drive, which has two cam shafts connected with each other by an endless drive, preferably a chain, with two tensioning shoes, which engage along an inner side of each strand of the endless drive and which are fastened respectively to a piston means, of which at least one piston is engageable by hydraulic medium for tensioning of the endless drive of the cam shafts.

2. Description of the Prior Art

With such a known apparatus, at least one piston is engaged with hydraulic medium applied thereto, whereby the tensioning shoes are engaged against the two strands of the endless drive and thereby tensioning the endless drive. Via the arrangement of the cam shafts, accelerations and delays result in the discharge strand and in the load strand of the endless drive, which accelerations and delays lead to beating or knocking of the endless drive. Consequently the entire collective structural parts of the drive, especially the tooth belt connecting the crank shaft of the internal combustion engine with the one cam shaft are subjected to a high wear. The impacts, beating or knocking in the endless drive also is effective upon the tensioning shoes. The piston standing or existing under the pressure of the hydraulic medium is effective hereby like a stiff or rigid body, so that the tensioning shoes are strongly loaded and burdened by the impacting, beating and knocking of the endless drive and being subject to an increased wear.

SUMMARY OF THE INVENTION

An object of the present invention is to embody the generic apparatus so that a premature wear of the parts of the apparatus is avoided.

This object is resolved and met with the generic apparatus in accordance with the present invention via the arrangement according to which both pistons are journalled elastically and resiliently yieldable counter to the tensioning pressure.

With the present inventive apparatus, both of two pistons are journalled resiliently or elastically yieldable counter to the tensioning direction. As a consequence of this double-acting embodiment and arrangement, there are avoided the shocks, impacts, beating and knocks of the endless drive and there are avoided with that the wear of the primary-side drive element, which means the wear of the toothed belt connecting the crank shaft with the cam shaft. If during the operation of the apparatus then still shocks, impacts, beating or knocking should occur in the endless drive, then the pistons can give or yield elastically, so that the tensioning shoes fastened on the piston means are subject to no increased wear. As a consequence of the resilient (spring) damping of the shocks, impacts, beating or knocking there is also less strong burdening or loading of the entire apparatus collectively, so that a long life expectancy is guaranteed and assured. As a consequence of the elastically-yielding journalling, the pistons are always again loaded into the tensioning position thereof so that the tensioning of the endless drive is not influenced.

Further objects and advantages of the present invention are apparent from the following description and disclosure, reference being made to the drawings setting forth features of the present invention in greater detail.

DESCRIPTION OF THE DRAWINGS

FIG. 2 is a view that shows a longitudinal section taken through a chain tensioning apparatus shown centrally in FIG. 1;

FIG. 3 is a view that shows a longitudinal section of a modified embodiment of the present inventive chain tensioning apparatus shown centrally in FIG. 1;

FIG. 4 is a view that shows another longitudinal section of a different embodiment of the present inventive chain tensioning apparatus shown centrally in FIG. 1;

FIG. 5 is a view that shows another longitudinal section of a further embodiment of the present inventive chain tensioning apparatus shown centrally in FIG. 1;

DETAILED DESCRIPTION

Figure 1:
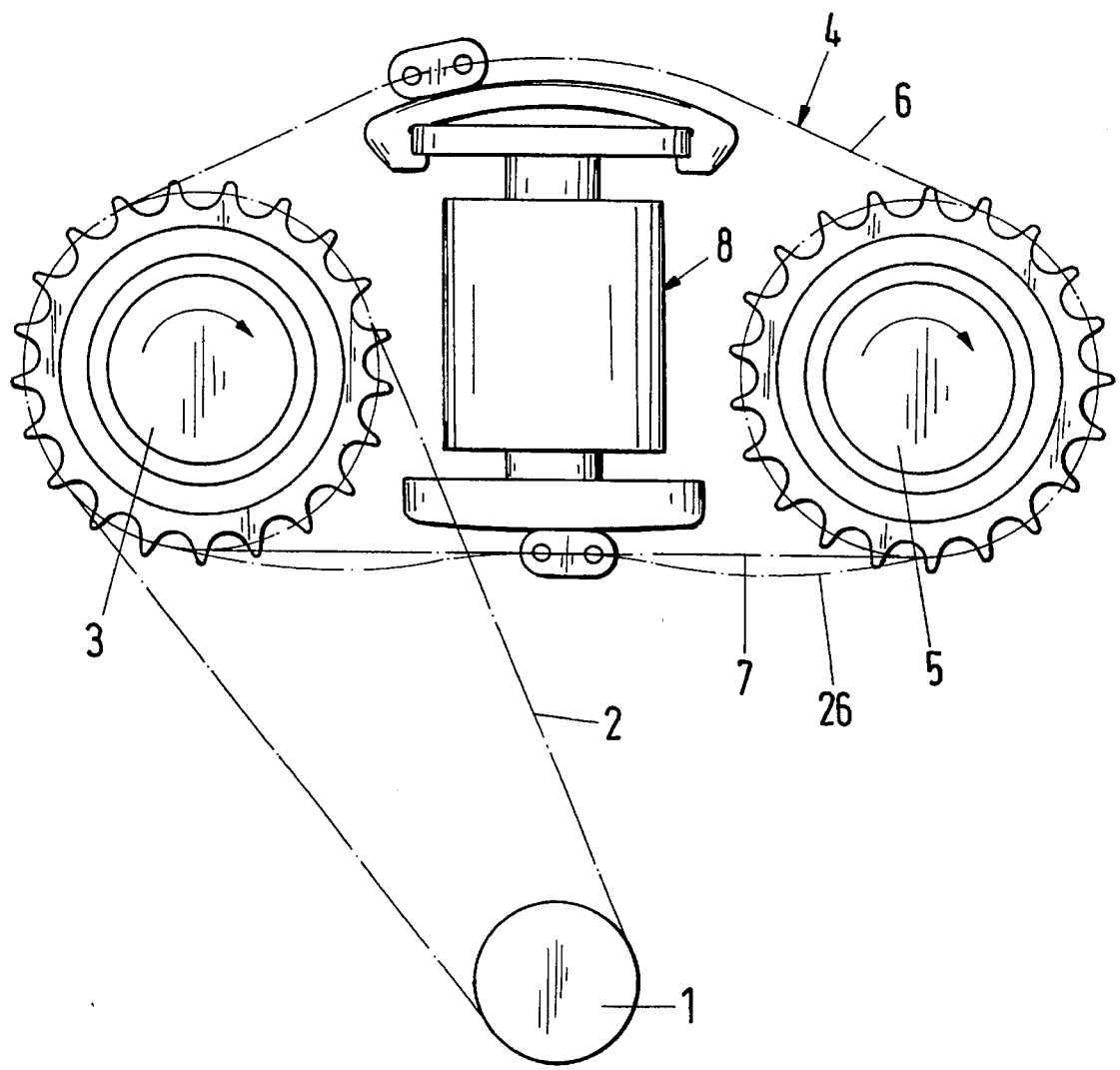
FIG. 1 is a view that provides a schematic representation of a cam shaft drive with a chain tensioning apparatus in accordance with the present invention.

FIG. 1 shows a crank shaft 1 of an internal combustion engine of a motor vehicle. The crank shaft 1 is drivingly connected via an endless drive 2, preferably a toothed belt, with a discharge or outlet cam shaft 3 with which the exhaust valve means of a non-illustrated motor are actuated. The outlet or exhaust-valve cam shaft 3 via an endless drive 4, preferably a chain, is drivingly connected with an inlet-valve cam shaft 5, with which the inlet valve means of the motor are controlled. A double-acting tensioning device or apparatus 8 engages along the inner side against the output or discharge branch or strand 6 and against the load branch or strand 7 of the chain.

The tensioning device or apparatus 8 with the sample embodiment according to FIG. 2 has a base body 9 which provides two bores 10 and 10'. Into the two bores 10 and 10' from both ends there projects respectively a hollow piston means 11 and 12, which respectively carry a tensioning shoe 13 and 14.

Over these tensioning shoes 13 and 14 there is guided a chain 4, of which only respectively one chain member is illustrated in FIG. 2. The tensioning shoes 13, 14 have a convex curved or bent top or upper side 15, 16, over which the chain members of the chain 4 glide in longitudinal direction of the respective strand or branch 6, 7.

The hollow piston 11 engages shiftably along the wall of the bore 10 and stands under the force of a pressure spring 17, which is supported or engaged with one end against the bottom 18 of the bore 10 and with its other end against the bottom 19 of the hollow piston 11. The other hollow piston 12 engages along the wall of the bore 10' and likewise stands under the force of a pressure spring 20, which is supported or engaged with one end against the bottom 21 of the bore 10' and with the other end against the bottom 22 of the hollow piston 12. The two bores 10 and 10' are located coaxially as to each other and have equal size diameter although separated from each other by an intermediate wall 23 of which both face sides form the base or bottom 18 respectively 21 of the bore 10 respectively 10'. The hollow piston means 11 is longer than the hollow piston means 12, which both project over the bore 10, 10'. Each of the tensioning shoes 13 and 14 via pressure springs 17, 20 are held in engagement against the two strands or branches 6 and 7 of the chain 4.

A hydraulic line or conduit 24 opens or flows into the bore 10 near the intermediate wall 28, through which hydraulic line or conduit 24 the hydraulic medium from a non-illustrated hydraulic source of the vehicle can be introduced into the bore 10. In the hydraulic line or conduit 24 extending through the base body 9 there is seated a return or check valve 25, which opens in a direction toward the bore 10. The hollow piston 10 with that stands not only under the force of the pressure spring 17 but rather also under the hydraulic pressure of the hydraulic medium supplied via the hydraulic line or conduit 24 and the check valve 25, which hydraulic medium fills the inner space or chamber of the hollow piston 11. Via the pressure engagement of the hollow piston 10 by means of the hydraulic medium, the tensioning shoe 13 is pressed firmly and steadily against the chain 4, whereby this chain is tensioned. Upon loading of the hollow piston 11 by chain impacts or strokes, the hollow piston 11 is effective like a rigid body. Still nevertheless respectively according to cam shaft configuration, it is the case that upon the load-branch-side 7 at the transition of the chain wheel or gear seated upon the inlet or intake cam shaft 5 there occurs and arises in the branch or strand 7 a slack or looseness 26 (FIG. 1), which leads to a relative twist or distortion of both cam shafts 3 and 5 against each other or relative to each other. Via further turning of the pulling outlet or exhaust cam shaft 3 there results a tightening or increase of tautness of the chain 4, whereby the chain strikes and engages hard upon the tensioning shoe 14. Since the hollow piston 12 carrying this tensioning shoe 14 is mechanically tensioned by the pressure spring 20, these chain impacts or shocks can be caught or intercepted superlatively and most successfully, in that the hollow piston 12 is shifted against the force of the pressure spring 20.

A further advantage of this device or apparatus 8 is that the two hollow pistons 11, 12 respectively exist and stand under spring force. If the internal combustion machine or engine has stood still or idle for a longer period of time, the hydraulic pressure decreases. After the starting of the internal combustion engine consequently the hydraulic pressure must first be built up again. The tensioning device 8 is also completely and fully effective in this case and situation during the starting, since the pressure springs 17, 20 press the hollow pistons 11, 12 outwardly and hold the chain 4 tensioned also without any hydraulic pressure at all.

With the embodiment according to FIG. 3, the piston 12a exists and stands under the force of a plate or disk-spring packet 27 which is engaged and supported at the bottom 21 of the bore 10' as well as at the bottom 22 of face-side depression 28 of the piston 12a. Moreover, this tensioning device or apparatus 8a is embodied identically like that of the embodiment according to FIG. 2. Also with this device or apparatus via the plate- or disk-spring packet 27 there is attained an optimum damping, when the chain impacts or shocks arise and occur in operation. Additionally, this device or apparatus 8a becomes effective also then during starting, when the hydraulic pressure after longer standstill of the internal combustion engine has dropped or decreased and must first build up again upon starting.

The tensioning device or apparatus 8b according to FIG. 4 has a solid or massively constructed piston 12b, which on its face side or end is provided with a ring-shaped or annular damping element 29. The damping element 29 engages against the bottom 21 of the bore 10'. Otherwise this device or apparatus is constructed identically like that of the embodiment according to FIG. 2. If chain impacts or shocks occur and arise, then via elastic deformation of the damping element 29, the chain shocks or impacts can be caught or taken up safely and certainly. The chain 4 is thereby protected against impermissible and unacceptable wear in a safe and certain manner. Also the tensioning shoes 13, 14 as a consequence of the elastic damping are not subject to any impermissible and unacceptable high wear.

With the embodiment according to FIG. 5, the piston 12c of the tensioning device or apparatus 8c is again embodied and constructed as a hollow piston, which however is considerably longer than with the preceding embodiments. The hollow piston is situated movably in the bore 10c, which passes through the base body 9c. The tensioning shoe 14 is seated upon the end of the hollow piston 12c projecting downwardly out of the bore 10c. A hollow piston 11c is guided shiftably in the hollow piston 12c and the hollow piston 11c is constructed and embodied identically as with the preceding embodiments. The hollow piston 11c exists and stands again under the force of the pressure spring 17, which engages against the bottom 19c of the hollow piston 11c as well as against the bottom 22c of the hollow piston 12c.

A hydraulic line or conduit 24c opens into the hollow space or chamber 30 of the hollow piston 12c and a return or check valve 25c lies in the hydraulic line 24c. Additionally, a throttle or choke location 31 is provided.

The pressure spring 17 tensions the hollow piston 11c always so far forward that the hydraulic line or conduit 24c is not blocked or closed by the hollow piston 11c. Consequently the hydraulic medium can flow via the hydraulic line or conduit 24c into the hollow space or chamber 30 of the hollow piston 12c as well as into the hollow piston 11c. The hollow piston 12c projects downwardly out of the base body 9c and carries the tensioning shoe 14, while the hollow piston 11c projecting upwardly out of the base body 9c provides the tensioning shoe 13. The hollow piston 12c is shiftable axially in the hollow piston 11c and exists and stands under force of the pressure spring 17 as well as pressure of the hydraulic medium supplied via the line or conduit 24c.

If chain impacts or shocks arise and occur, then the hollow piston 11c can be shifted against the force of the pressure spring 17 as well as that of the hydraulic medium in order to catch or take up the chain shocks and impacts in a damped manner. The hydraulic medium located in the hollow piston 11c is displaced via the throttle location 31 subject to by-passing of the return or check valve 25c. Via the throttle cross section there is assured and guaranteed a damped movement of the hollow piston 11c in a simple and straight forward manner. In contrast to the preceding embodiments, with this device or apparatus 8c the elastic damping is attained hydraulically.

Figure 6:
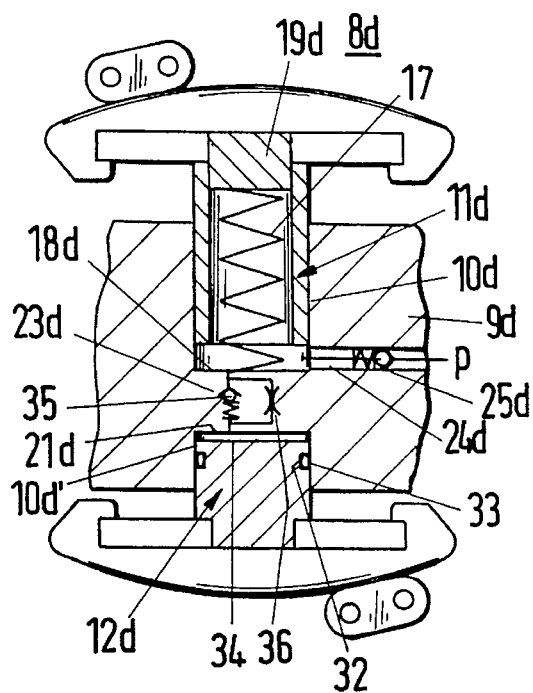
FIG. 6 is a view that shows another longitudinal section of an additional embodiment of the present invention chain tensioning apparatus shown centrally in FIG. 1.

FIG. 6 shows a tensioning device or apparatus 8d of which the hollow piston 11d is embodied and constructed identically as with the embodiment according to FIG. 2. The hollow piston 11d exists and stands under the force of the pressure spring 17 which engages or is supported against the bottom 19d of the hollow piston 11d as well as against the bottom 18d of the bore 10d of the base body 9d. The hydraulic line or conduit 24d opens into the bore 10d and the check or return valve 25d is seated therein. As with the embodiments according to FIGS. 2, 3 and 4, the hollow piston 11d is so loaded or biased at all times via the pressure spring 17 that the hydraulic line or conduit 24d is open.

The other piston 12d is embodied and constructed solid or massively and has an annular or ring seal 33 placed into an annular or ring groove 32 and the seal 33 for example can be an O-ring. The piston 12d is guided shiftably in the bore 10d' and sealed-off with the O-ring seal 33. The intermediate wall 23d has a hydraulic line or conduit 34 passing therethrough, which connects the bore 10d with the bore 10d'. In this hydraulic line or conduit 34 there is seated a return or check valve 35 which opens in a direction toward the bore 10d'. Additionally there is provided a throttle location 36, via which the hydraulic medium can be displaced in a still to be described manner out of the bore 10d' into the bore 10d upon occurrence and encountering of chain shocks or impacts.

The hydraulic medium is introduced under pressure into the bore 10d via the hydraulic line or conduit 24d and the return or check valve 25d. Thereby the hollow piston lid with support, aid and assistance of the spring 17 is loaded in a direction upon the corresponding chain branch or strand. Simultaneously the hydraulic medium can flow also in the bore 10d' via the hydraulic line or conduit 34 and the check or return valve 35. Thereby the space or chamber between the face side or end of the piston 12d and the bottom 21d of the intermediate wall 23 is pressure engaged with the hydraulic medium. With that the chain 4 can be tensioned satisfactorily in a faultless manner. If chain shocks or impacts arise and are encountered, then the pistons 11d respectively 12d can be shifted and pushed back damped in the pertaining bore 10d respectively 10d'. The hydraulic medium located in the particular bore is then displaced into the respective other bore.

If the piston 12d encounters and is engaged by the chain impacts or shocks, the hydraulic medium is displaced via the throttle location 36 subject to by-passing of the return or check valve 35, whereby an optimum damping of the chain is attained. Accordingly also with this embodiment the resilient damping is undertaken hydraulically.

Figure 7:
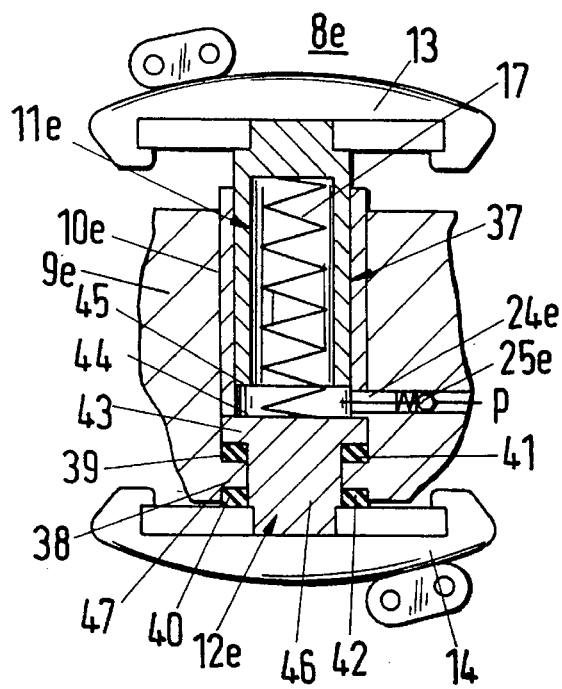
FIG. 7 is a view that shows another longitudinal section of an additional embodiment of the present inventive chain tensioning apparatus shown centrally in FIG. 1.

With the embodiment according to FIG. 7, the resilient damping occurs via mechanical parts. A sleeve or bushing 37 is installed in the bore 10e of the base body 9e of the tensioning device or apparatus 8e, in which sleeve or bushing 37 the hollow piston 11e is guided in a shiftable manner. The hydraulic line or conduit 24e with the check or return valve 25e opens into the sleeve or bushing 37 pressed into the bore 10e. The hollow piston 11e projects upwardly over the sleeve or bushing 37 and carries the tensioning shoe 13.

With spacing below the sleeve or bushing 37, the bore 10e is provided with a radially inwardly projecting ring or annular flange 38 on the two face or end sides 39 and 40 of which respectively an elastic deformable damping ring means 41 and 42 engage. The damping ring 41 engages against an underside of a head part 43 of the piston 12e. This head part 43 in turn with a mantle surface thereof engages against a wall of the bore 10e. The face side or end 44 of the head part 43 engages against a face side or end 45 of the sleeve or bushing 37 located within the bore 10e. The ring or annular-shaped intermediate space or chamber between the head part 43 of the piston 12e and the face side or end 39 of the ring or annular flange 38 is filled-out by the damping ring 41.

The head part 43 adjoins a guide part 46 smaller in diameter, which guide part 46 with its mantle surface is guided shiftably along an inner peripheral surface of the ring or annular flange 38. The end of the guide part 46 projecting downwardly out of the base body 9e carries the tensioning shoe 14. Upon the guide part 46 there are seated the two damping rings 41 and 42, of which the lower damping ring 42 engages upon the face side or end 40 of the ring or annular flange 38 as well as upon the upper side or top 47 of the tensioning shoe 14.

Via the two elastically or deformable damping rings 41, 42, the piston 12e is journalled elastically resiliently in both directions. Consequently there is then also attained thereby an optimum spring-damped chain tensioning, when the chain shocks or impacts are effective in changing directions upon the device or apparatus 8e. The pressure spring 17 is engaged or supported upon the face side or end 44 of the head part 43 of the piston 12e.

Figure 8:
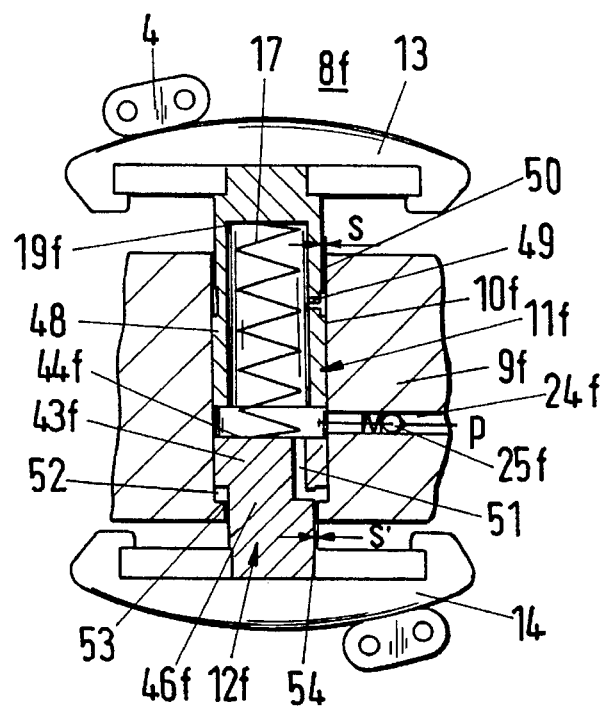
FIG. 8 respectively is a view that shows another longitudinal section of a further embodiment of the present inventive chain tensioning apparatus shown centrally in FIG. 1.

The tensioning device or apparatus 8f according to FIG. 8 likewise has a piston 12f which is journalled damped dually or in a double manner. In contrast to the embodiment according to FIG. 7, the damping in this situation occurs hydraulically. The hollow piston 11f is guided shiftably in the bore 10f of the base body 9f corresponding to the embodiment according to FIG. 2. The hydraulic line or conduit 24f with the check or return valve 25f opens into the bore 10f. The hollow piston 11f is biased or loaded in tensioning direction by the pressure spring 17. The pressure spring 17 engages against the bottom 19f of the hollow cylinder 11f as well as upon the face side or end 44f of the piston 12f. The cylindrical wall 48 of the hollow piston 11f has a bore 49 radially passing therethrough in half length thereof approximately, which bore 49 opens into a ring or annular space or chamber 50, which is formed between the wall of the bore 10f and the mantle surface of the hollow piston 11f in the region above the bore 49. The radial width s of the ring or annular chamber 50 is so selected that the throttle location is formed via which the hydraulic medium can be discharged only in a throttled manner. This annular space or chamber 50 is formed by a restriction or decrease of the outer diameter of the part of the wall 48 of the hollow cylinder 11f located above the bore 49.

The piston 12f is again made in a solid or massive manner and has a hydraulic bore 51 passing therethrough which opens in the face side or end 44 of the piston 12f. Additionally the hydraulic bore 51 opens into an annular space or chamber 52 which lies between the head part 43 of the piston 12f and a radially inwardly directed collar 53. The collar 53 is provided at the end of the bore 10f toward the tensioning shoe 14 and surrounds the guiding part 46f of the piston 12f with a nominal or small radial play s'. Consequently a ring-shaped or annular throttle location 54 is formed thereby, which has the same and identical function as the annular space 50 likewise effective as a throttle location, which partially surrounds the hollow piston 11f.

The two pistons 11f and 12f lie above respectively below the opening of the hydraulic line 24f into the bore 10f. Via the hydraulic medium which is supplied by way of a hydraulic line or conduit 24f and the check or return valve 25f into the bore 10f, the two pistons 11f and 12f are engaged oppositely as to each other so that the chain 4 is tensioned over the tensioning shoes 13, 14. The bore 49 and the ring or annular chamber 50 respectively the hydraulic line or conduit 51 and the ring or annular chamber 54 are so small that a pressure drop does not occur or occurs only in a very nominal extent or measure via these lines during operation. On the other hand, via these throttle locations 50, 54 there is assured and made possible that upon encountering chain impacts or shocks, the pistons 11f, 12f can be shifted under displacement of the hydraulic medium so that the chain shocks or impact are resiliently damped in an outstanding manner. Via the throttle locations 50, 54, the displaced hydraulic medium can be discharged or carried away in a throttled manner so that an optimum damping is attained.

According to the circumstances as to the type or manner and angle of the relative rotation of the shafts 3, 5 as to each other and the embodiment or construction of the slack or looseness 26, also a combination of hydraulically effective damping and mechanical damping can be employed and installed in accordance with the features of the present invention.

In summary, the present invention provides an apparatus for tensioning of a cam shaft drive which has two cam shafts connected with each other by way of an endless drive, preferably a chain, and including two tensioning shoes, which engage against an inner side of each branch or strand of the endless drive and secured or fastened at respectively one piston, of which at least one piston is engageable by hydraulic medium for tensioning of the endless drive of the cam shafts, characterized thereby that both pistons 11, 11c to 11f; 12, 12a to 12f are yieldably journalled elastically counter to the tensioning pressure.

The piston means 11, 11c to 11f; 12, 12a to 12f are yieldably journalled by at least one elastically deformable damping part 20, 27, 29 41, 42.

The piston 11, 11c to 11f; 12, 12a to 12f is elastically yieldably journalled by at least one hydraulically effective damping part 31, 36, 50, 54.

The elastically deformable damping part 20 is a spring loading the piston 12 into its tensioning position, preferably being a screw-pressure or coil spring, which preferably engages against the bottom 22 of a depression of the piston 12 and against a wall 23 of a base body 9 of the device or apparatus 8.

The elastically deformable damping part 27 is a plate or dish-spring packet loading a piston 12a into the tensioning position thereof, which spring packet preferably is supported or engaged against the bottom 22 of a depression 28 of the piston 12a and against a wall 21 of the base body of the apparatus or device 8a.

The elastically deformable damping part 29 is a damping ring consisting of an elastically deformable material, which ring lies between a face side or end of the piston 12b away from the tensioning shoe 14 and a wall 21 of the base body of the device or apparatus 8b.

The piston 12e is surrounded by two damping rings 41, 42 arranged with spacing from each other, via which the piston 12e is resiliently supported in directions opposite to each other.

A bore 10e of the base body 9e receiving the piston 12e along its wall has an inwardly directed annular collar 38, against the two face sides or ends 39, 40 thereof the damping rings 41, 42 engage.

The hydraulically effective damping part 31 is formed by a throttle location, which lies parallel to a return or check valve arranged in a hydraulic medium supply line or conduit 24c, which opens in a direction upon the piston 11c, 12c to be engaged.

A hydraulically effective damping part 36 is formed by a throttle location, which lies parallel to a check or return valve 35, that lies in a hydraulic line or conduit 34 interconnecting two pressure chambers 10d, 10d'.

The two pressure chambers 10d, 10d' are limited or defined by an intermediate wall 23d of the base body 9d of the device or apparatus 8d separate from each other and bounded by the piston means 11d, 12d.

The hydraulically effective damping part 50, 54 is formed by at least one throttle location surrounding at least the one piston 11f, 12f, which throttle location preferably is a ring or annular chamber with a gap width s surrounding the one piston 11f, which annular chamber advantageously is connected with the pressure chamber by at least one bore 49 passing through the wall 48 of the piston 11f.

The throttle location 54 is an annular chamber surrounding the other piston 12f with a gap width s'.

The annular chamber 54 is connected with the pressure space or chamber by at least one bore 51 passing through the piston 12f.

The present invention is, of course, in no way restricted to the specific disclosure of the specification and drawings, but also encompasses any modifications within the scope of the appended claims.

What we claim is:

1. An apparatus for tensioning of a camshaft drive with two camshafts connected with each other by an endless drive, said apparatus comprising:

a housing;

a first piston displaceably guided in said housing;

a first tensioning shoe fixedly connected to said first piston and engaging an inner side of a first branch of the endless drive;

a first tensioning means engaging said first piston for biasing said first tensioning shoe in a first tensioning direction against said inner side of the first branch of the endless drive;

said first tensioning means being elastically yieldable counter to said first tensioning direction;

a means for supplying a hydraulic medium to said first piston for loading said first piston in said first tensioning direction;

a second piston displaceably guided within said housing;

a second tensioning shoe fixedly connected to said second piston and engaging an inner side of a second branch of the endless drive;

a second tensioning means engaging said second piston for biasing said second tensioning shoe in a second tensioning direction against said inner side of the second branch of the endless drive;

said second tensioning means being elastically yieldable counter to said second tensioning direction; and wherein said first and said second pistons operate independently of one another and wherein at least said second tensioning means is a damping means for compensating shocks occurring within the endless drive.

2. An apparatus according to claim 1, wherein said first tensioning means is a coil spring.

3. An apparatus according to claim 2, wherein said first piston has a hollow interior with an opening opposite said first tensioning shoe and a bottom opposite said opening, wherein said coil spring is positioned in said hollow interior and is supported with one end at said bottom and with the other end at said housing.

4. An apparatus according to claim 1, wherein said second tensioning means is a coil spring.

5. An apparatus according to claim 4, wherein said second piston has a hollow interior with an opening opposite said second tensioning shoe and a bottom opposite said opening, wherein said coil spring is positioned in said hollow interior and is supported with one end at said bottom and with the other end at said housing.

6. An apparatus according to claim 1, wherein said second tensioning means is a dish-spring packet.

7. An apparatus according to claim 6, wherein said second piston has a depression with a bottom opposite said tensioning shoe for receiving said dish-spring packet, wherein said dish-spring packet is supported between said bottom of said depression and said housing.

8. An apparatus according to claim 1, wherein said second tensioning means is an elastically deformable damping ring.

9. An apparatus according to claim 8, wherein said second piston has an end opposite said tensioning shoe and wherein said damping ring is supported between said end of said piston and said housing.

10. An apparatus according to claim 1, wherein:
said second piston has a first and a second end;
said second tensioning shoe is connected to said first end;
said second tensioning means is a first damping ring surrounding said first end of said second piston and supported at said second tensioning shoe and at said housing.

11. An apparatus according to claim 10, further comprising a second damping ring surrounding said second end of said second piston.

12. An apparatus according to claim 11, wherein:
said housing has a bore in which said second piston is received;
said bore has an inwardly projecting collar with a first end face facing said second tensioning shoe and a second end face facing away from said second tensioning shoe;
said second end of said second piston has an outwardly projecting collar;
said first damping ring is supported at said first end face of said inwardly projecting collar and said tensioning shoe;
said second damping ring is supported at said second end face of said inwardly projecting collar and said outwardly projecting collar of said second piston.

13. An apparatus according to claim 1, wherein said housing has a first and a second bore, wherein said first piston is received in said first bore and wherein said second piston is received in said second bore.

14. An apparatus according to claim 13, wherein said housing has an intermediate wall separating said first and said second bores.

15. An apparatus according to claim 13, wherein said first and said second bores are coaxially positioned to one another.

* * * * *